June 5, 1928.
G. E. BRENT
SHAFT HOLDFAST
Filed Feb. 14, 1925
1,672,601
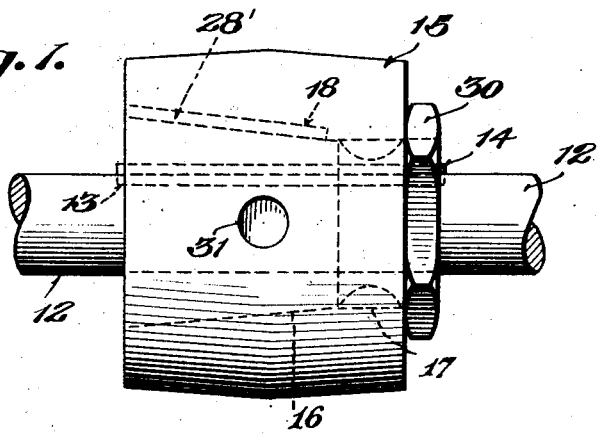
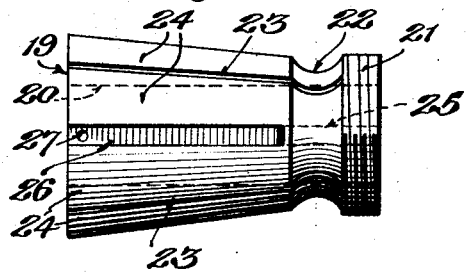
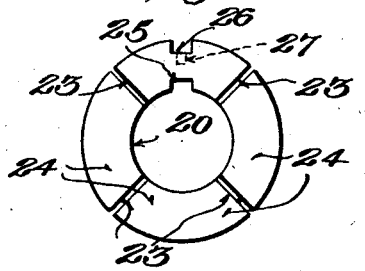
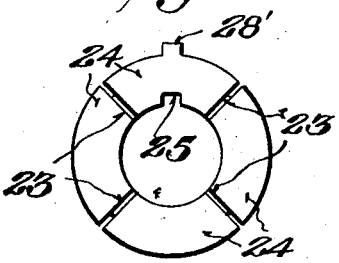
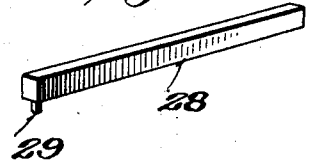

Patented June 5, 1928.

1,672,601

UNITED STATES PATENT OFFICE.

GEORGE E. BRENT, OF NASHVILLE, TENNESSEE.

SHAFT HOLDFAST.

Application filed February 14, 1925. Serial No. 9,300.

This invention provides a holdfast for reliably securing and removably holding a pulley, pinion, gear, cam, propeller, or other part or member on a rotatable shaft.

It is an object of the invention to afford such means for, or as a part of, such members, which not only will maintain them securely on a shaft, but also will enable their easy removal without damage to the shaft, holdfast, or other parts.

Another object of the invention is so to arrange the parts that warping or twisting is avoided in the event the holdfast is not put on the shaft sufficiently tight.

Still another object of the invention is so to form a key as a part of the device that it will not slip in its keyway during the locking operation.

Further, it is an object of the invention to provide means whereby the locking-nut of the device is held securely against working loose from the position to which it has been tightened.

When considered with the description herein, the characteristics of the invention are apparent from the accompanying drawings, forming part hereof, wherein embodiments of the invention are disclosed, for purposes of illustration.

Although the disclosures herein exemplify what now are considered to be preferable embodiments of the invention, it is to be understood that it is not the intention to be limited necessarily thereto in interpretation of the claim, as modifications and adaptations within the limits of the claim can be made without departing from the nature of the invention.

Like reference-characters refer to corresponding parts in the views of the drawings, of which—

Fig. 1 is a side elevation of the holdfast;
Fig. 2 is a view of the sleeve;
Fig. 3 is an end view thereof;
Fig. 4 is a view of another form of sleeve;
Fig. 5 is a view of a key.

Referring more particularly to the drawings, 12 designates a shaft, which may be a driving or driven one. The shaft may have a longitudinal keywey 13 with a key 14 therein.

The holdfast provided by the invention includes an outer collar or member 15, which may be a cam or the like, or which may be the hub or equivalent part of a gear, pinion, propeller, or other thing to receive motion from or to drive the shaft. The member has an annular bore or chamber, the wall of which is inclined with respect to the axis or is conical from one end to near the other end, as shown at 16 in Fig. 1, and thence continues to the latter end with its wall parallel to the axis, as shown at 17 in Fig. 1. A longitudinal keyway 18 opens to the inclined part of the bore.

An inner sleeve or bushing 19, constituting a clutch member, is formed with a bore 20 arranged to receive the shaft with which the holdfast is to be associated, it has an exterior configuration of tapered or substantially conical form for substantially the same length from one end, and of substantially the same inclination, as the inclined portion of the bore of the collar, and it is arranged to be disposed in the collar. The sleeve at its smaller end has an exteriorly-threaded terminal portion 21 arranged to be disposed in and to project from the smaller portion of the bore of the collar, and it has an annular exterior groove 22 between the threaded end portion and the conical portion, whereby the amount of metal at that place is lessened. Longitudinal slots 23 extend from the larger end of the sleeve through the groove 22 and from the periphery to the bore, whereby the sleeve is split and clutch-fingers 24 are afforded. The reduced amount of metal at the groove 22 permits these fingers more readily to spring against the shaft. A longitudinal keyway 25 in the bore of the sleeve is arranged to receive the key 14 of the shaft, and a longitudinal keyway 26 having a recess 27 therein is on the exterior of the sleeve. The keyways 18 and 26 of the collar and sleeve are arranged to accommodate a key 28 having a pin or other suitable projection 29 capable of seating in the recess 27, whereby to prevent longitudinal movement of the key. Preferably the keyways 25 and 26 are located substantially in alinement with each other in the same finger 24, whereby relative warping or twisting among the several fingers that might result from locating them in different fingers is avoided. Instead of forming the sleeve with an outer keyway for accommodation of a key cooperatively seating in the keyway of the collar, the sleeve may have at the same place a longitudinal rib 28' integrally formed therewith arranged to seat in the collar-keyway 18, as seen in Fig. 4.

When the holdfast is to be placed on a shaft, and the key 14 being in place thereon, the sleeve is positioned loosely in the collar and the two members shoved onto the shaft so that the keyway 25 of the sleeve receives the key 14. A nut 30 is placed on the protruding threaded end of the sleeve, either before or after it is shoved onto the shaft, and the nut is turned against and in contact with the end of the collar, and it draws the fingers of the sleeve inwardly of the conical bore of the collar and causes them by wedging action to clutch the shaft tightly. The pin or projection 29 of the key 28 seated in the recess 27 prevents longitudinal movement of that key in its sleeve-seat while the sleeve is being drawn into the bore of the collar. When the holdfast is to be used on a shaft that of itself does not offer sufficient resistance to rotary motion to resist the effort resulting from turning the nut on or off, the collar may have a recess 31 in its side, into which may be inserted the end of a rod, wrench, or other article capable of holding the collar against rotation.

For some purposes the clutch action of the fingers in the conical bore against the shaft when the nut is turned tightly home is sufficient to resist relative tortional and longitudinal efforts between the shaft and holdfast, and in such circumstances the keys 14 and 28 may be dispensed with. However, to prevent relative turning of the parts with respect to each other as a result of comparatively great tortional effort, the keys are employed.

The holdfast may be removed by loosening the nut, tapping against the outer end of the sleeve to move the member sufficiently in the conical bore of the collar to permit the fingers to spring slightly away from the shaft, and then pulling or tapping the holdfast off from the shaft.

Having thus described my invention, what I claim as new, and desire to secure by Letters Patent, is—

A device for securing parts to a shaft comprising a contractile exteriorly-tapered sleeve member having a bore arranged to receive a shaft and a longitudinal groove in the bore to receive a key of the shaft, and having also a threaded terminal, a collar member having a tapered bore, there being a longitudinal key on one of said members and a longitudinal groove on the other arranged to receive said key, the groove in the sleeve-bore, the key, and the groove to receive the latter being alined, and a nut on said threaded terminal arranged to bear against an end of said collar member and to draw said sleeve member inwardly thereof.

In testimony whereof I affix my signature.

GEORGE E. BRENT.